(12) United States Patent
Hamada

(10) Patent No.: US 7,073,871 B2
(45) Date of Patent: Jul. 11, 2006

(54) THREE PIECE AUTOMOBILE WHEEL

(75) Inventor: Masanobu Hamada, Osaka (JP)

(73) Assignee: Speed Star Co., Ltd., Osaka (JP)

( * ) Notice: Subject to any disclaimer, the term of this patent is extended or adjusted under 35 U.S.C. 154(b) by 114 days.

(21) Appl. No.: 10/815,762

(22) Filed: Apr. 2, 2004

(65) Prior Publication Data

US 2004/0195902 A1    Oct. 7, 2004

(30) Foreign Application Priority Data

Apr. 4, 2003    (JP)    ............................. 2003-102202

(51) Int. Cl.
*B60B 25/00*    (2006.01)

(52) U.S. Cl. .................... 301/5.24; 301/10.1; 152/396; 152/427

(58) Field of Classification Search ................. 301/9.1, 301/10.1, 11.1, 63.102, 5.24; 152/396, 398, 152/402, 403, 404, 406, 427
See application file for complete search history.

(56) References Cited

U.S. PATENT DOCUMENTS

| | | | | |
|---|---|---|---|---|
| 2,552,082 A | * | 5/1951 | Ash | ............................ 301/6.7 |
| 2,868,258 A | * | 1/1959 | Powers | ........................ 152/543 |
| 2,871,905 A | * | 2/1959 | Stanton | ....................... 152/404 |
| 2,917,098 A | * | 12/1959 | Lafaye | ......................... 152/427 |
| 4,417,766 A | | 11/1983 | Smith et al. | |
| 4,453,776 A | * | 6/1984 | Rohr | .......................... 301/5.24 |
| 4,997,235 A | * | 3/1991 | Braungart | ................... 301/11.1 |
| 6,598,939 B1 | * | 7/2003 | Muller | ....................... 301/11.1 |

FOREIGN PATENT DOCUMENTS

| | | | |
|---|---|---|---|
| JP | 63-279901 | * | 11/1988 |
| JP | 5-24405 | * | 2/1993 |
| JP | 9-48221 | | 2/1997 |
| JP | 2002-219916 | | 8/2002 |
| JP | 2003-2002 | | 1/2003 |

* cited by examiner

*Primary Examiner*—Russell D. Stormer
(74) *Attorney, Agent, or Firm*—Wenderoth, Lind & Ponack, L.L.P.

(57) ABSTRACT

The three piece automobile wheel is provided with an inner rim, an outer rim, and a center disc. The center disc is attached to a flange section of the inner rim and outer rim. A trough is established in the inner rim between the flange section and rim flange. The outer side-wall of the trough nearest the flange section is disposed off the rim center-plane towards the center disc, a valve opening passes through the outer side-wall for valve attachment, and the configuration allows the valve base to be disposed inside the trough. The center disc is provided with a through-hole region to expose the valve stem to the outside.

14 Claims, 3 Drawing Sheets

THREE PIECE AUTOMOBILE WHEEL

BACKGROUND OF THE INVENTION

1. Field of the Invention

This invention relates to a three piece wheel for use in an automobile.

2. Discussion of the Related Art

FIGS. 1 and 2 show cross-section views of three piece automobile wheels. In the aluminum wheels shown in the figures, an inner rim 11, 21, outer rim 12, 22, and center disc 13, 23 are rigidly joined by fastening bolts 14, 24. Opposing regions of the inner rim 11, 21 and the outer rim 12, 22 bend inwards to establish a flange section 15, 25, and fastening bolts 14, 24 pass through the center disc 13, 23 and this flange section 15, 25 to rigidly join the wheel as a unit.

The three piece wheel of FIG. 1 is a known aluminum wheel provided with a trough 17 in both the inner rim 11 and the outer rim 12. The trough 17 is necessary for installing a tire 120 on the wheel. This is because the bead region 121 of the tire 120 has an inside diameter which is smaller than the outside diameter of the rim flange 16. As a result, the tire 120 cannot be set in place, with the entire perimeter of the bead region 121 in the plane of the rim 18, unless one part of the bead region 121 is placed in the trough 17 allowing it to pass over the rim flange 16. The aluminum wheel shown in FIG. 1 has a trough 17 established in its outer rim 12, and a valve 110 passes through, and is fixed to the side-wall 117 of the trough 17. The valve 110 has a base 111 disposed inside the wheel and a stem 112 is fixed to the valve opening 113. The stem 112 is outside of the center disc 13 and is exposed outside the wheel.

Since the three piece wheel of FIG. 1 is provided with a trough 17 in its outer rim 12 and the outer perimeter of the center disc 13 is attached to the bottom of the trough 17, the outside diameter of the center disc 13 becomes small. A three piece wheel, which has a small center disc 13 outside diameter for a given rim outside diameter, has the drawback that a high quality aesthetic design is not possible. This is because a high quality design can be achieved by increasing the size of the center disc, which is more aesthetically pleasing than the rim, and increasing the diameter of the track of the fastening bolts attached at the outer perimeter of the center disc. Many users of aluminum wheels give priority to wheel design over function. In particular, users, who install aluminum wheels to improve the aesthetic design of an automobile, generally install aluminum wheels with center discs which are as large as possible. For this reason, it is very important to increase the outside diameter of the center disc of a three piece wheel.

The aluminum wheel of FIG. 1 also has the drawback that the valve 110 can damage the tire 120 when driving after the tire 120 has punctured. This is because the punctured and deflated tire 120 bead region 121, which is internally reinforced with bead wire, becomes separated from the rim flange 16, moves inward, and abrades against the valve 110 base 111. In particular, when an automobile is driven after puncture and deflation, the bead region 121 of the tire 120 can strike the valve 110 base 111 with significant force and cause considerable tire 120 damage after drifting only slightly away from the rim flange 16. As a result, a tire 120 with a damaged bead region 121 cannot be driven on again even if the puncture is repaired. From a traffic safety viewpoint, an automobile cannot always stop immediately if a tire puncture occurs. For example, if tire puncture occurs on a high speed roadway such as a freeway, it is necessary to move the vehicle to a safe pull-off area. If the tire 120 bead region 121 is damaged while driving to a pull-off area, the tire cannot be driven on again even if the puncture is repaired. Tire repair on a high speed roadway can be performed by repair personnel who can come to the site. In this case, repair personnel cannot bring an assortment of tire types, that fit all types of automobiles, to the repair site. This is because the number of different types of tires is extremely large. As a result, it is very important to be able to drive on a tire after the puncture is repaired at the site. An automobile, which cannot be driven even after puncture repair, must be moved by being towed by a wrecker. Compared to puncture repair, towing an automobile with a punctured tire using a wrecker is much more troublesome and service costs are much higher. This is because wrecker fees are incurred in addition to the cost of tire replacement. Further, towing an automobile with a wrecker on a high speed roadway is definitely not desirable from a traffic safety viewpoint. An automobile can also be moved by placement on a cargo truck, but this method can incur even more cost. Therefore, reducing tire damage caused by driving on a punctured tire is extremely important from both a safety standpoint and an economic standpoint.

In the three piece wheel shown in FIG. 2, a trough 27 is provided in the inner rim 21 but not in the outer rim 22. In a three piece wheel with this structure, the outside diameter of the center disc 23 can be made larger. This is because the center disc 23 can be fixed to the outer rim 22, which has no trough 27. However, if an automobile is driven after puncturing a tire 220 with a three piece wheel having this structure, the tire 220 can still be damaged considerably. In a three piece wheel of this structure, although the valve 210 is disposed with separation from the rim flange 26 where the tire bead region 221 is mounted, the valve 210 still projects beyond the plane of the rim 28. Therefore, the wheel has the drawback that if the bead region 221 of a punctured and deflated tire 220 drifts to the position of the valve 210 the bead region 221 can be damaged considerably. When a punctured and deflated tire 220 is driven on, it is impossible to totally avoid movement of the tire bead region 221 to the center region of the plane of the rim 28. Consequently, bead region damage incurred by driving on a punctured tire 220 cannot be reliably prevented by a configuration which disposes the valve base 211 in the center region separated from the rim flanges 26. In particular, valves 210 housing tire 220 air pressure sensors, which are becoming prevalent recently, have extremely large assemblies that project beyond the plane of the rim 28. As a result, a large projecting assembly can cause substantial damage when a punctured tire 220 is driven on. In addition, since the pressure sensor assembly projects beyond the plane of the rim 28, the pressure sensor can be directly pressed upon by the force of the punctured tire 220 resulting in its failure when the punctured tire 220 is driven on. Further, in in FIG. 2, reference numeral 212 shows a stem of valve 210.

The present invention was developed to correct these types of drawbacks seen in related art three piece wheels. Thus it is a primary object of the present invention to provide a three piece automobile wheel which can reduce damage to the tire bead region when a punctured tire is driven on, while increasing the size of the center disc to allow high quality design. Another important object of the present invention is to provide a three piece automobile wheel which can use a valve type which houses a pressure sensor, and prevent its failure when tire puncture occurs.

SUMMARY OF THE INVENTION

The three piece automobile wheel of the present invention is provided with an inner rim, an outer rim which joins with the inner rim to form the wheel rim, and a center disc which connects with the outer rim. Opposing surfaces of the inner rim and the outer rim bend inwards to establish a flange section to which the center disc is attached. Fastening bolts, which pass through the flange section of the inner and outer rims, fix the center disc to the inner and outer rims to form the three piece wheel unit. A trough is established in the inner rim between the flange section and the rim flange. The outer side-wall of this trough closest to the flange section is disposed off the center of the rim plane towards the center disc side. Further, a valve opening is cut through the outer side-wall of the trough for valve attachment. This establishes a configuration allowing the valve base to be disposed inside the trough. An open region is also provided in the center disc to expose the valve stem, which is mounted in the valve opening, outside the center disc.

The flange section of the inner and outer rims can be provided with a through-hole region to pass the valve stem attached to the valve opening through. The angle of inclination a of the trough outer side-wall with respect to the rim center-plane can be made approximately 20°. The depth of the trough adjacent to the outer side-wall can be preferably greater than or equal to 15 mm and less than or equal to 35 mm. The centerline distance (d) from the outer side-wall to the flange section can be 10 mm to 60 mm, preferably 10 mm to 50 mm, and more preferably 10 mm to 40 mm. In addition, a valve housing a tire pressure sensor can be installed in the valve opening.

The above and further objects and features of the invention will more fully be apparent from the following detailed description with accompanying drawings.

DETAILED DESCRIPTION OF THE PREFERRED EMBODIMENTS

Figure 3:
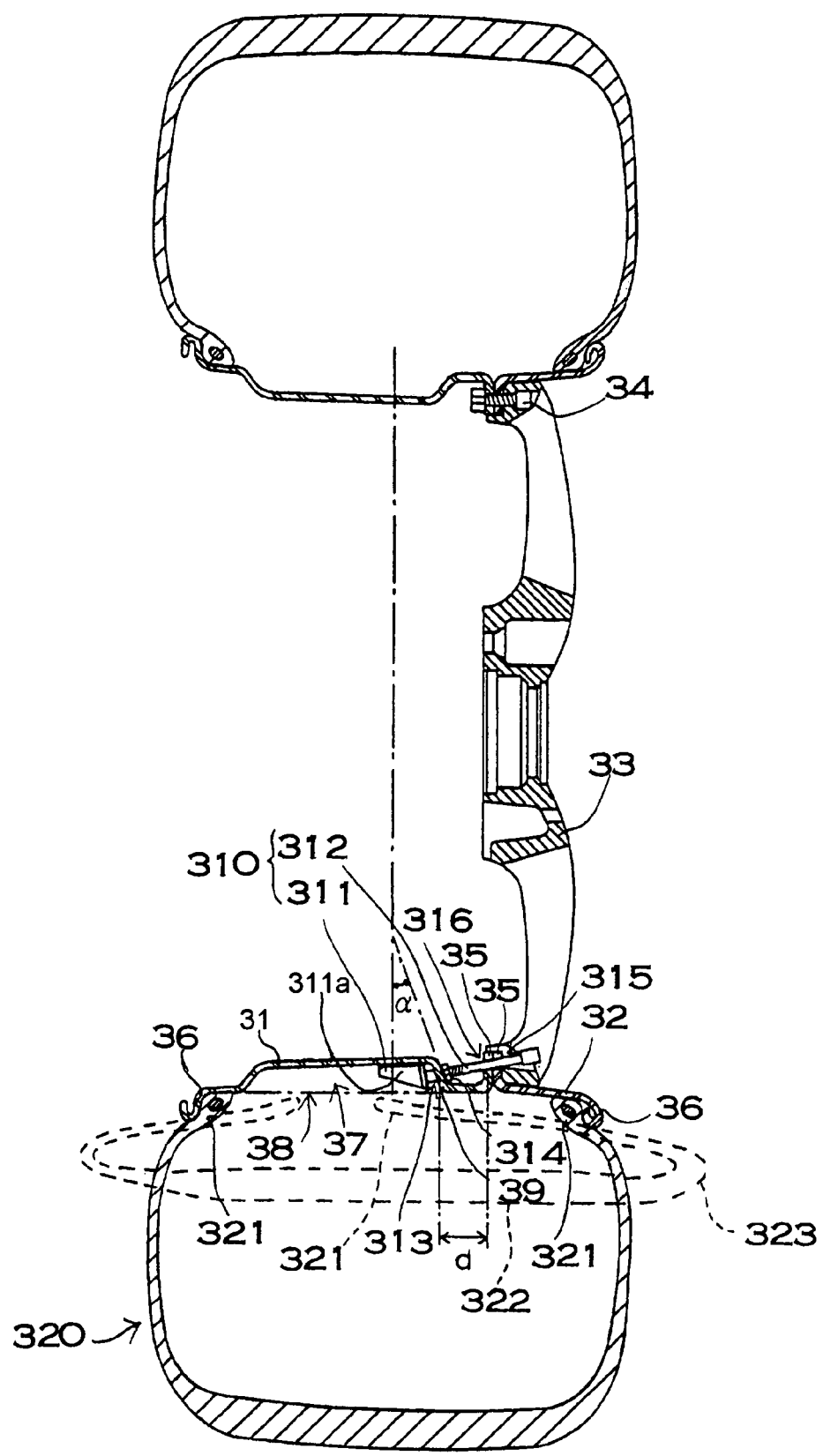
FIG. 3 is a cross-sectional view of a three piece automobile wheel constructed in accordance with an embodiment of the present invention.

The three piece automobile wheel shown in the cross-section view of FIG. 3 comprises an inner rim 31, an outer rim 32, and a center disc 33 made of aluminum. The inner rim 31 and outer rim 32 are made of aluminum sheet processed by metal spinning, forged from aluminum, or cast from aluminum. The center disc 33 is made from forged or cast aluminum. However, in this application, the word aluminum is used in its broader sense to include aluminum alloys. Further, the center disc can also made of forged or cast magnesium or magnesium alloy. Still further, the center disc can also made of forged or cast iron or iron alloys including steel.

The inner rim 31 and outer rim 32 are each cylindrical in shape, a rim flange 36 is provided along one edge to hold the tire bead 321 inside, and the other edge which mates the two rims together is bent inward to establish a flange section 35. The inner rim 31 and outer rim 32 form the wheel rim and the center disc 33 is attached to the flange section 35 via fastening bolts 34. Specifically, the wheel rim is made up of the two parts, the inner rim 31 and the outer rim 32, the center disc 33 is configured as another part, and the three piece wheel is made by connecting these with fastening bolts 34. The joint between the inner rim 31 and the outer rim 32 is welded together. This is to prevent air from leaking out between flange sections 35 of the joined inner rim 31 and outer rim 32. However, it is not always necessary to weld together the flange sections 35 of the inner rim 31 and outer rim 32. This is because sealing material can also be applied between the flange sections of the inner and outer rims to prevent air leaks.

Figure 1:
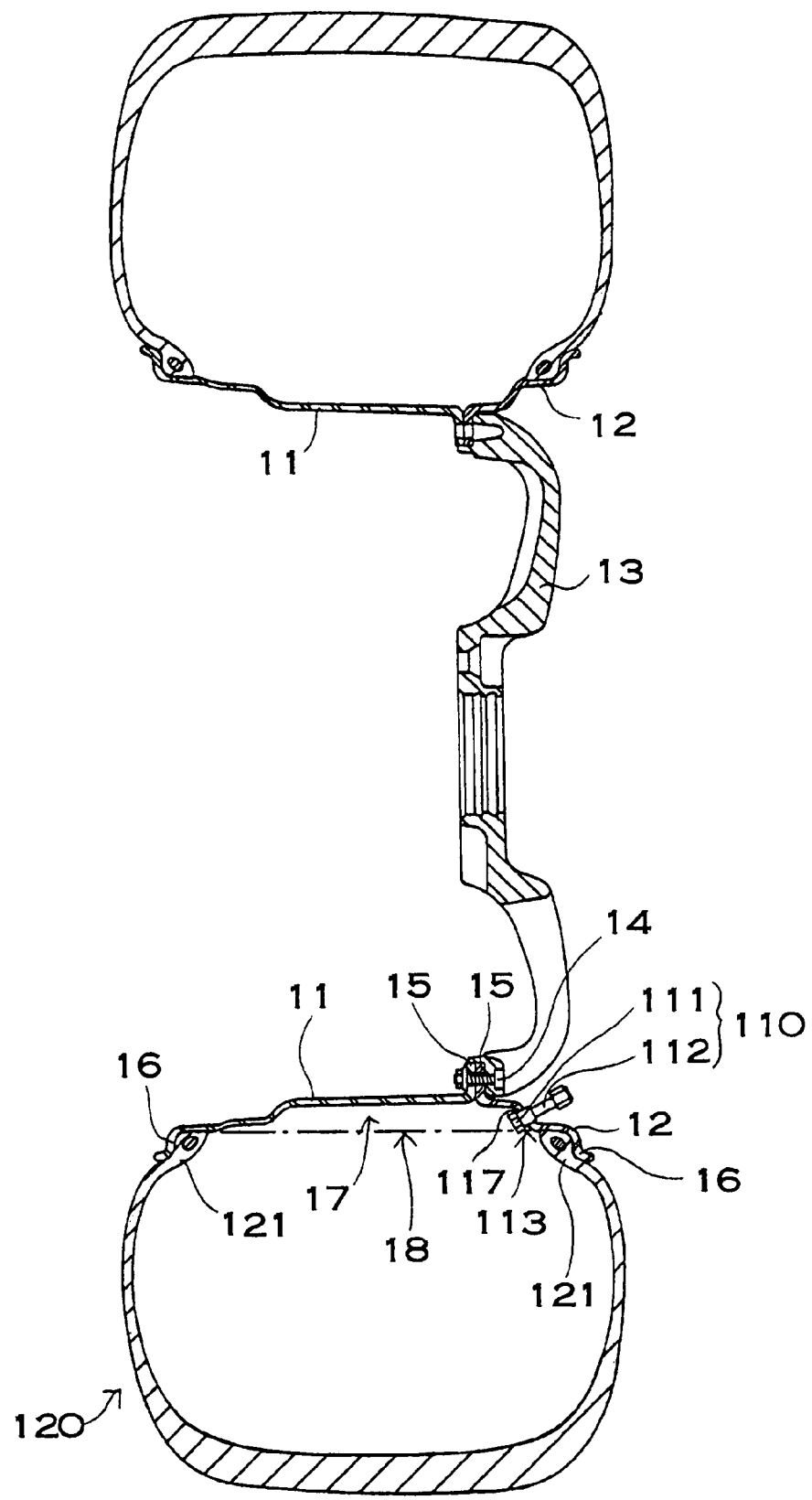
FIG. 1 is a cross-sectional view showing one example of a prior art three piece wheel.
Figure 2:
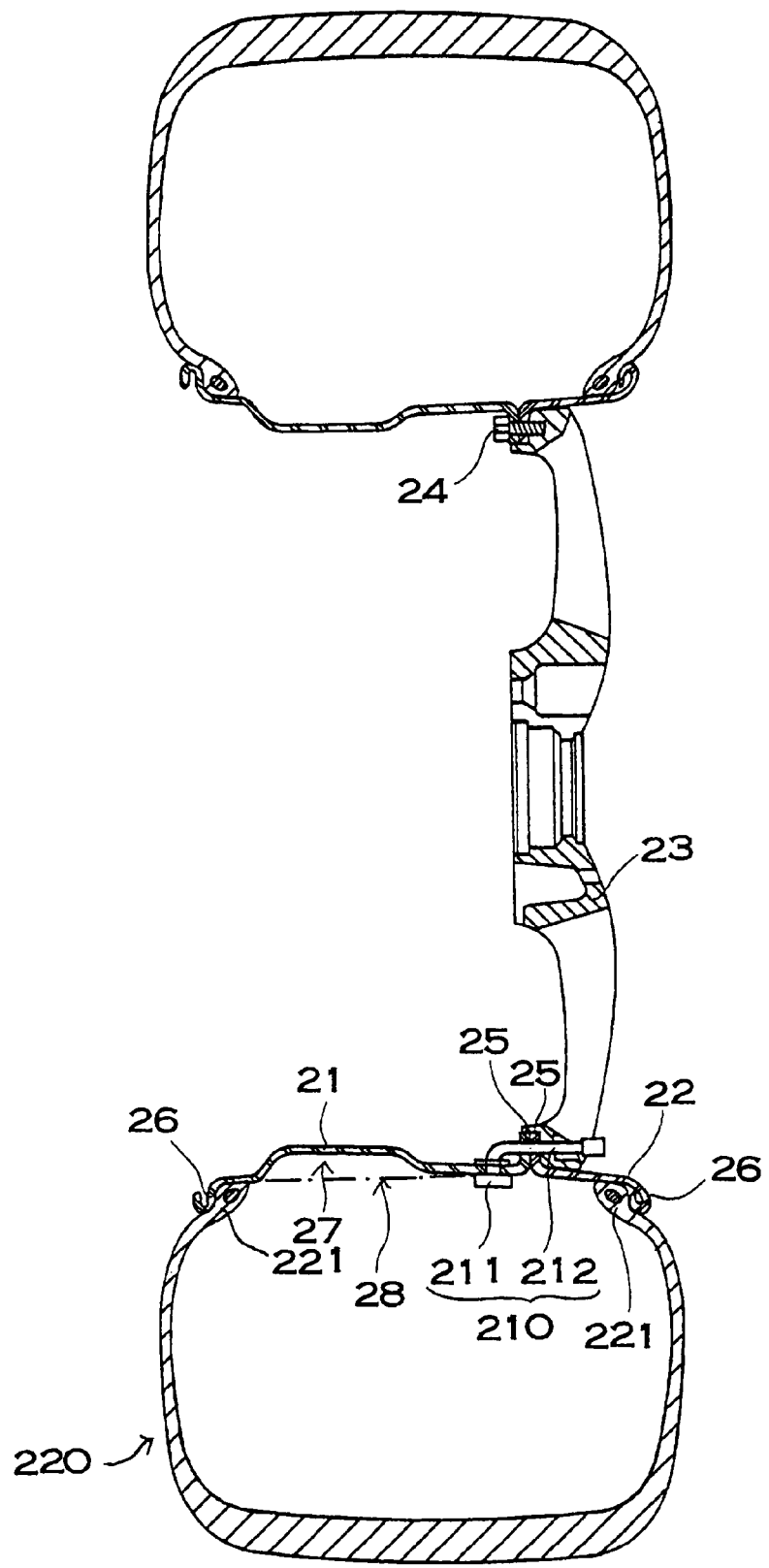
FIG. 2 is a cross-sectional view showing another example of a prior art three piece wheel.

The inner rim 31 is wider than the outer rim 32, and a trough 37 is established between the rim flange 36 and the flange section 37. The trough 37 is provided for installation of the tire 320 on the wheel. One part of the tire bead region 321, which does not stretch, is guided into the trough 37 to insert the bead region 321 into rim flange 36 of the wheel. The trough 37 is wider than that of the related art wheel shown in FIG. 2, and the trough outer side-wall 39 nearest the flange section 35 is disposed off the rim center-plane towards the center disc 33. The purpose of this is to put the valve 310, which attaches to the outer side-wall 39, close to the center disc 33. This is implemented in the three piece wheel of FIG. 3 by making the centerline distance (d) between the outer side-wall 39 and the flange section 35 approximately 30 mm. In this application, "the centerline distance between the outer side-wall and the flange section" is taken to mean the shortest distance between center, in the direction of the valve 310 stem 312 and outer side-wall thickness, and flange section 35 center shown in FIG. 3. The centerline distance between the outer side-wall and the flange section (d) can be, for example 10 mm to 60 mm, preferably 10 mm to 50 mm, and more preferably 10 mm to 40 mm.

The depth of the trough 37 adjacent to the outer side-wall 39 is approximately 20 mm. However, the depth of the trough 37 adjacent to the outer side-wall 39 can also be made greater than or equal to 15 mm and less than or equal to 35 mm. If the trough is too shallow, the valve base fixed to the outer side-wall will project beyond the plane of the rim. Conversely, if the trough is too deep, the inner wall of the rim will project prominently towards the wheel center, the minimum inside diameter of the rim wall will become small, and systems disposed inside the wheel, such as the brake mechanism and suspension system, can more easily collide with the wheel.

In the three piece wheel of FIG. 3, the angle of inclination α of the trough outer side-wall 39 with respect to the rim center-plane is made approximately 20°. However, for the purposes of this application, "the angle of inclination α is made approximately 20°" means the angle of inclination α is in the range of 20°±5°, or 15° to 25°. An outer side-wall 39 with this angle of inclination α allows the valve stem 312, which attaches to the outer side-wall 39, to assume an ideal direction. This is because the valve stem 312, which attaches to the outer side-wall 39, inclines only slightly towards the center of the wheel, and the end of the stem 312 is separated from the wall of the outer rim 32 making it easy to fill the tire 320 with air.

A valve opening 313 passing through the outer side-wall 39 is provided to allow the valve 310 to be fixed to the outer side-wall 39. The valve stem 312, which inserts into the valve opening 313, is provided with threads on its surface. The valve stem 312 inserts through the valve opening 313 from the inside, and a nut 314 is screwed onto the male threads of the valve stem 313 outside the outer side-wall 39 to fix the valve 310 to the outer side-wall 39. However, the present invention does not limit the configuration for attachment of the valve 310 to the outer side-wall 39. The valve can be attached to the valve opening by another configuration which does not leak air. For example, the valve stem can also be attached in an air-tight fashion without using a nut by using only a gasket. In this case, the gasket is made of a rubber-like flexible material formed in a cylindrical shape that can be inserted into the valve opening, and both ends of the cylindrical gasket are provided with collars which flexibly sandwich both sides of the valve opening.

The valve 310, with its stem 312 inserted through the valve opening 313 and fixed to the outer side-wall 39, has its valve base 311 disposed inside the trough 37 and its valve stem 312 projecting outside the wheel. The valve base 311 disposed inside the trough 37 has an outline which does not project beyond the plane of the rim 38. In other words, the depth of the trough 37 is such that the valve base 311 does not project beyond the plane of the rim 38. The valve 310 of FIG. 3 has a valve base 311 which houses a pressure sensor 311a to detect the air pressure inside the tire 320. The pressure sensor 311a detects the pressure of air inside the tire 320, and contains electronic circuitry to transmit detected pressure signals in a wireless fashion to a receiver provided in the automobile. The air pressure sensor 311a detects air pressure inside the tire via a pressure sensing element, modulates a carrier wave with the output signal from the pressure sensing element, and makes wireless transmissions of the modulated carrier wave.

The pressure sensor also houses a power supply circuit to operate the electronic circuitry. The power supply circuit is provided with a resonant circuit having an antenna coil to receive electromagnetic waves sent from a transmitter inside the automobile, a rectifying circuit to rectify alternating current induced in the resonant circuit, and a smoothing capacitor to convert current pulses output from the rectifying circuit to smooth direct current. Since this power supply circuit acquires a source of direct current from electromagnetic waves sent from the automobile, a battery does not need to be housed in the valve base. However, a battery can be housed in the valve base to operate the electronic circuitry. In addition, the valve base can also house both a rechargeable battery and a circuit to acquire a source of direct current from electromagnetic waves, and a circuit configuration to receive electromagnetic waves and charge the rechargeable battery can be implemented.

The valve base 311 of FIG. 3 is shaped with one surface disposed along the bottom plane of the trough 37, and the opposing outer surface disposed in a manner which does not project beyond the plane of the rim 38 and is a smooth surface slightly inclined away from the plane of the rim 38. This valve base 311 shape can minimize damage to the bead region 321 when a punctured tire 320 is driven on. This is because the tire 320 bead region 321 can only touch the valve base 311 over a wide area.

An open region 315 is provided in the center disc 33 to expose the valve stem 312, which is attached to the valve opening 313, outside the center disc 33. This is for the purpose of connecting an air-filling nozzle to the valve stem 312, which is also fixed to the outer side-wall 39. Finally, since the stem 312 of the valve 310 of FIG. 3 also passes through, and extends outside the flange section 35 of the inner rim 31 and the outer rim 32, a through-hole region 316 is provided to allow the valve stem 312 to pass through the flange section 35.

A three piece automobile wheel with the configuration described above has the characteristic that the size of the center disc can be increased to allow high quality design. This is because as shown in FIG. 3, a trough 37 is provided in the inner rim 31, and there is no need for a trough in the outer rim 32. The center disc 33, which attaches to the outer rim with no trough, can be made with a larger outside diameter.

The three piece automobile wheel of the present invention also has the characteristic that tire bead region damage can be prevented when driving with a punctured tire. This is because a trough 37 is provided in the inner rim 31, the outer side-wall 39 of this trough 37 is disposed off the center of the rim plane 38 towards the center disc 33, a valve opening 313 is cut through the trough outer side-wall 39 next to the center disc 33, and the valve base 311 attached in the valve opening 313 is disposed inside the trough 37. In particular for the three piece automobile wheel of the present invention, the trough 37 provided to allow tire installation has its position altered for insertion of the valve base 311. Since the valve 310 is disposed inside the trough 37, the valve base 311 attached to the outer side-wall 39 does not project beyond the plane of the rim 38. Consequently, this configuration can effectively prevent the tire bead region 321 from forcibly striking the valve 310 and damaging the tire when a punctured tire is driven on. Specifically, when a punctured tire is driven on, the thick treaded crown region of the tire does not deform, rather the tire side-walls 323 fold as shown by the broken lines of FIG. 3, and the bead and crown regions 322 pile up and press on the plane of the rim 38. In other words, the tire 320 bead region 321 does not deeply enter into the trough 37, and damage does not result from the bead region 321 strongly striking the valve base 311. In addition, since the valve base 311 is not directly pressed upon with force from the deflated tire, direct pressure from the tire on a large valve base and failure of an internal pressure sensor can be effectively prevented in this situation.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or the equivalence of such metes and bounds thereof are therefore intended to be embraced by the claims.

This application is based on Application No. 2003-102202 filed in Japan on Apr. 4, 2003, the content of which is incorporated hereinto by reference.

What is claimed is:

1. A three piece automobile wheel comprising an inner rim; an outer rim joined to the inner rim to form a wheel rim; and a center disc attached to the outer rim, wherein inner rim and outer rim surfaces in mutual opposition are bent inwards to establish a flange section for center disc attachment, and the center disc is fixed to the inner rim and the outer rim by fastening bolts which pass through the flange section of the inner and outer rims, and wherein a trough is provided in an outside wall of the inner rim between the flange section and an inner rim flange, the outer side-wall of the trough nearest the flange section is disposed off a rim center-plane closer to the center disc, a valve opening is provided to attach a valve which passes through the outer side-wall, the configuration allows a valve base of the valve to be disposed inside the trough, and an open region is provided in the center disc to expose a valve stem of the valve, wherein the valve stem is attached to the valve opening, outside the center disc.

2. A three piece automobile wheel as recited in claim 1 wherein the inner rim, outer rim, and center disc are aluminum or aluminum alloy.

3. A three piece automobile wheel as recited in claim 1 wherein the inner rim, outer rim, and center disc are magnesium or magnesium alloy.

4. A three piece automobile wheel as recited in claim 1 wherein a through-hole region is provided in the flange section of the inner and outer rims to pass the valve stem, which is attached to the valve opening.

5. A three piece automobile wheel as recited in claim 1 wherein the trough outer side-wall angle of inclination □ with respect to the rim center-plane is 15° to 25°.

6. A three piece automobile wheel as recited in claim 1 wherein the depth of the trough near the outer side-wall is greater than or equal to 15 mm.

7. A three piece automobile wheel as recited in claim 6 wherein the depth of the trough near the outer side-wall is less than or equal to 35 mm.

8. A three piece automobile wheel as recited in claim 1 wherein the centerline distance (d) between the outer side-wall and the flange section is 10 mm to 60 mm.

9. A three piece automobile wheel as recited in claim 1 wherein the centerline distance (d) between the outer side-wall and the flange section is 10 mm to 50 mm.

10. A three piece automobile wheel as recited in claim 1 wherein the centerline distance (d) between the outer side-wall and the flange section is 10 mm to 40 mm.

11. A three piece automobile wheel as recited in claim 1 wherein the depth of the trough is such that the base of the valve does not project out beyond the plane of the rim.

12. A three piece automobile wheel as recited in claim 1 wherein the depth of the trough near the outer side-wall is greater than or equal to 15 mm and less than or equal to 35 mm.

13. A three piece automobile wheel as recited in claim 1 further comprising an air pressure sensor disposed in the valve base.

14. A three piece automobile wheel as recited in claim 1 wherein the valve base is shaped with one surface disposed along the bottom plane of the trough, the opposing outer surface disposed in a manner which does not project beyond the plane of the wheel rim, and this outer surface is a smooth surface which inclines slightly away from a shape which is aligned along the plane of the rim.

* * * * *